E. R. BEEMAN & T. BRENNAN, Jr.
DOUBLE DISK ATTACHMENT.
APPLICATION FILED OCT. 28, 1914.
1,184,508. Patented May 23, 1916.
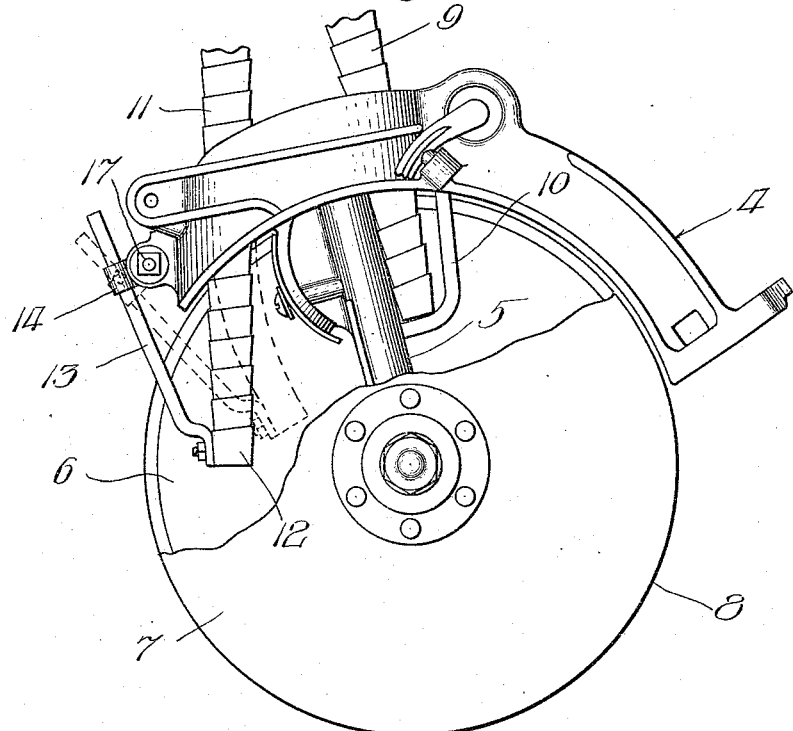
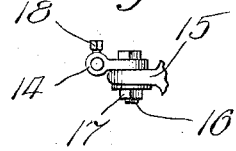
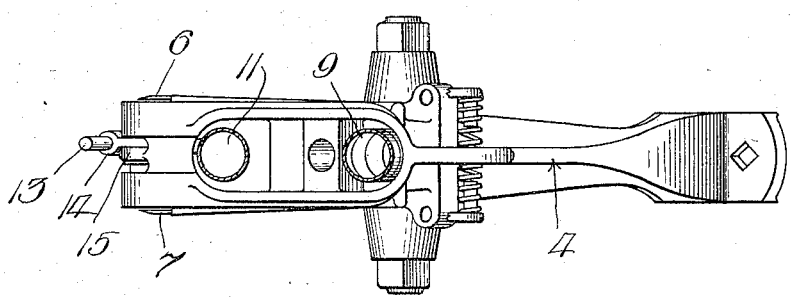
Witnesses:
Inventors
Edwin R. Beeman
Thomas Brennan Jr.

UNITED STATES PATENT OFFICE.

EDWIN R. BEEMAN AND THOMAS BRENNAN, JR., OF ST. LOUIS PARK, MINNESOTA, ASSIGNORS TO MONITOR DRILL COMPANY, OF MINNEAPOLIS, MINNESOTA, A CORPORATION OF MINNESOTA.

DOUBLE-DISK ATTACHMENT.

1,184,508. Specification of Letters Patent. Patented May 23, 1916.

Application filed October 28, 1914. Serial No. 869,117.

*To all whom it may concern:*

Be it known that we, EDWIN R. BEEMAN and THOMAS BRENNAN, Jr., both citizens of the United States, and both residing at St. Louis Park, Hennepin county, Minnesota, have invented certain new and useful Improvements in Double-Disk Attachments, of which the following is a specification.

The present invention has reference to certain improvements in double disk furrow-openers or seeding attachments, and has reference particularly to certain improvements in the construction of the spout whereby fertilizer and the like is delivered into the furrow after the deposit therein of the seed.

The invention also has reference to certain improvements in the relationship which the fertilizer spout bears to the grain delivery spout and to the disks of the attachment. In this connection, an object is to so relate the parts that the fertilizer may be deposited in the desired manner.

Where the fertilizer is to be deposited in the furrow after the seed has been deposited therein, it is desirable to provide a construction such that the fertilizer will not come directly in contact with the seed, but such that, on the other hand, a layer of dirt or soil of the desired thickness will fall in to cover over the seed before the fertilizer is deposited. This will prevent the possible burning of the seed by the fertilizer. At the same time, it is desirable to be able to regulate or determine the thickness of this layer of soil so that it may be adjusted according to the nature of the seed which is being deposited, the nature of the soil, and the nature of the fertilizer which is being used.

Other objects and uses will appear from a detailed description of the invention, which consists in the features of construction and combinations of parts hereinafter described and claimed.

In the drawing—Figure 1 shows a side elevation of a double disk attachment provided with the fertilizer delivery spout to which the present invention relates, the upper portion of the disk on the near side of the attachment being broken away so as to reveal the construction of the fertilizer spout and its relation to the remaining elements; Fig. 2 shows a top or plan view of the attachment shown in Fig. 1; and Fig. 3 is a detailed view of the support whereby the position of the fertilizer spout may be adjusted either vertically or backward and forward.

Referring to the drawing, the frame 4 of the instrument may be of any one of a number of different constructions, the same being provided with a downwardly depending boot or the like 5. The lower end of this boot carries the bearings for the disks 6 and 7, which disks are so mounted that they come into contact with each other at the proper angle, substantially at the point 8 in Fig. 1.

The frame is provided with a perforation for the accommodation of the seed spout 9 directly in front of boot 5. As a matter of convenience, a supporting rod or bar 10 may be mounted below the opening which accommodates the spout 9, said rod or bar serving to limit the downward or lowering movement of said spout. Nevertheless, this support 10 does not interfere with a free delivery of the seed between the disks at a point in advance of the boot 5. It will therefore be seen that the seed is delivered between the disks in advance of the boot.

As the double disk attachment is drawn along the soil will begin to fill in over the seed after the same has been deposited, so that by the time the attachment has passed away from a given point the furrow within which the seed has been deposited will be substantially filled up or closed, there remaining simply the evening operation, which is performed in the usual manner, as, for example, by a chain drag.

In order to enable the farmer to deposit the fertilizer within the furrow but after the seed has been partially covered, or covered to a desired depth, by the soil, we have provided the fertilizer delivery spout 11. The latter extends down through a hole in the rear portion of the frame and at a point behind the boot. This spout is preferably made of such form that the position of its lower end 12 can be readily adjusted back and forth. In the particular arrangement illustrated the spout 11 is made up from a piece of sheet metal twisted into spiral form, the convolutions of the spiral drawing together toward the lower end of the spout so that the fertilizer will readily pass down through the spout, and so that the spout itself can be twisted or bent without interfering with the free descent of the fertilizer. The lower end of the spout is attached to a rod or the like 13, which passes through a sleeve 14. This sleeve in turn is pivotally mounted on an ear 15 which extends rearwardly from the frame of the attachment. The sleeve may be rocked about a pivotal point 16 and may be locked in any given position by tightening up a nut or the like 17. The elevation of the rod with respect to the sleeve may be adjusted and fixed by means of a set screw 18. It therefore follows that not only can the elevation of the lower end of the fertilizer delivery spout be adjusted, but also said lower end can be swung back and forth and maintained in any given position. By means of this or any equivalent arrangement, the point at which the fertilizer will be deposited with respect to the disks can be adjusted. For example, by setting the spout farther back the fertilizer will be delivered at a time when a greater amount of soil has fallen in onto the seed, whereas by setting the fertilizer spout farther forward the fertilizer will be deposited at such a point that the seed will only be covered with a very thin layer of soil. At the same time, the vertical position of the fertilizer spout may be adjusted for the purpose of still further controlling the thickness of the layer of soil which will be deposited over the seed before the fertilizer is deposited.

The thickness of the layer of soil which will be deposited will depend, among other things, upon the time interval elapsing between the instant of seed deposit and the instant of fertilizer deposit over said seed. This interval of time can be controlled by setting the discharge end of the spout 11 backward or forward, as well as by raising and lowering the said lower end.

It will be understood that the fertilizer spout occupies the position between the disks where said disks are spread a considerable distance apart. On account of this fact, the fertilizer spout will not in any manner interfere with the operation of the disks. It therefore follows that by placing the fertilizer spout behind the boot it occupies a position where it may be adjusted either up and down or back and forth through a wide range of adjustments, without interfering with the disks, and at the same time the fertilizer is deposited after a layer of soil has fallen in over the seed.

While we have herein shown and described a construction in which the seed delivery spout is in advance of the boot and the fertilizer spout behind the boot, still there might arise occasions where it would be desirable to reverse the arrangement, feeding the fertilizer in through the forward spout and the grain through the rear spout. It will therefore be understood that these spouts may be used interchangeably for the delivery of either grain or fertilizer.

While we have herein shown and described only a single form of construction embodying the features of our invention, still it will be understood that we are not limited to the same except as we may limit ourselves in the claims, but contemplate within the scope of our invention equivalent constructions.

We claim:

1. In a seeding attachment, the combination with a pair of disks and a mounting for the same to permit rotation of the disks, of means for delivering grain at a desired point between the disks, and means for delivering fertilizer at a point between the disks behind the point of grain delivery, said fertilizer delivering means being adjustable toward and from the grain delivering means and also being adjustable in a vertical direction.

2. In a seed attachment, the combination with a pair of disks, and a suitable mounting for the same, said mounting permitting rotation of the disks, of means for delivering grain between the disks at a desired point, means for delivering fertilizer between the disks at a point behind said grain delivering means, said fertilizer delivering means being adjustable toward and from the grain delivering means, and means for securing the fertilizer delivering means in any desired adjusted position.

3. In a seed attachment, the combination with a disk opener, and a suitable mounting for the same, said mounting permitting rotation of the disk, of means for delivering grain into the soil at a point where the same is opened by the disk opener, means for delivering fertilizer at a point behind the grain delivering means, said fertilizer delivering means being adjustable toward and from the grain delivering means, and means for securing the fertilizer delivering means in any desired adjusted position.

4. In a seed attachment, the combination with a disk opener, of means for delivering grain into the soil at a point where the soil is opened by said opener, and means for delivering fertilizer into the soil at a point behind said grain delivering means, said fertilizer delivering means being adjustable toward and from the grain delivering means under the control of the operator.

EDWIN R. BEEMAN.
THOMAS BRENNAN, Jr.

Witnesses:
GEORGE F. MOSELEY,
A. C. WALLENTIN.

Copies of this patent may be obtained for five cents each, by addressing the "Commissioner of Patents, Washington, D. C."